UNITED STATES PATENT OFFICE.

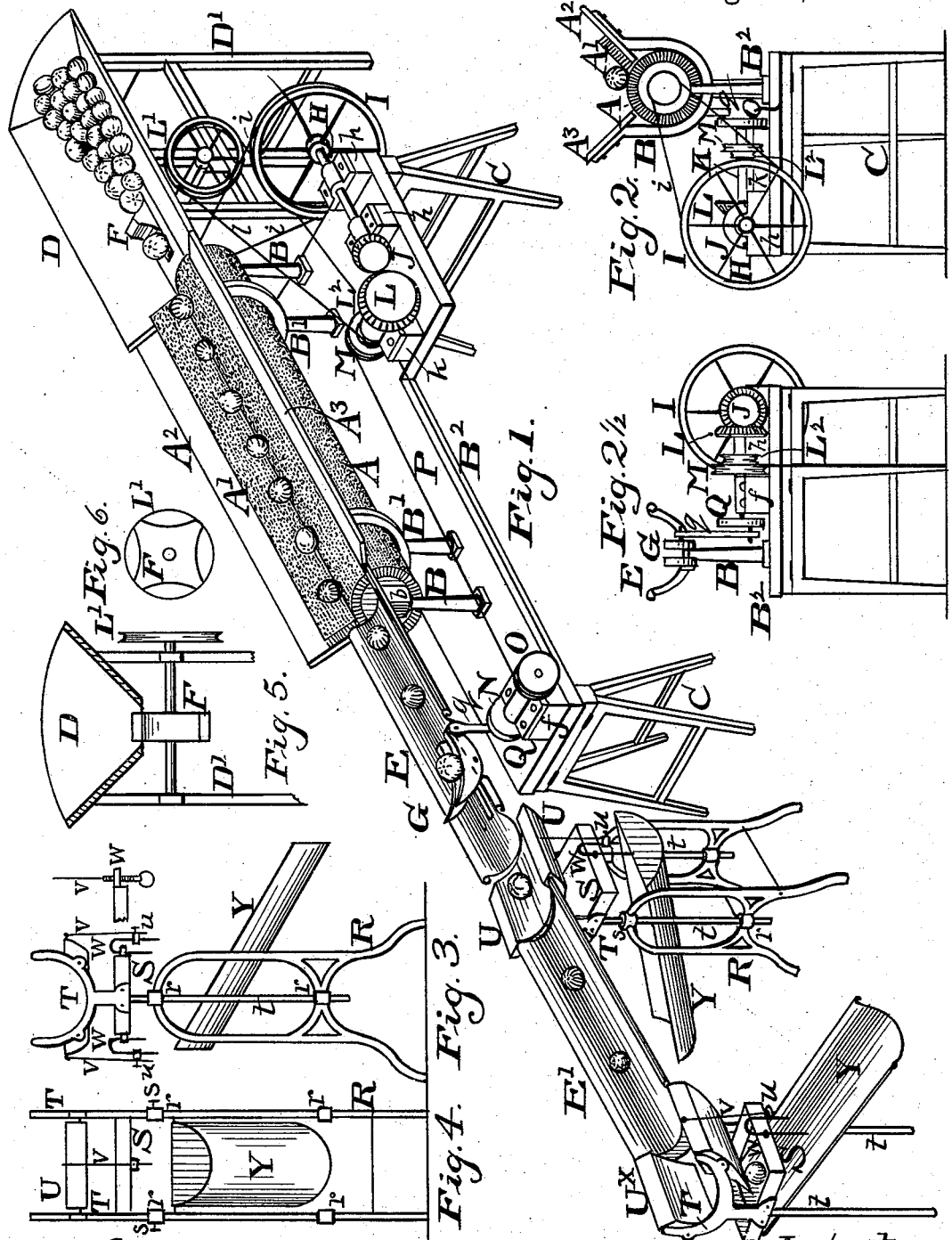

WALTER P. RICE AND HARVEY RICE, OF CLEVELAND, OHIO.

MACHINE FOR CLEANING AND ASSORTING FRUITS.

SPECIFICATION forming part of Letters Patent No. 589,141, dated August 31, 1897.

Application filed November 10, 1896. Serial No. 611,637. (No model.)

*To all whom it may concern:*

Be it known that we, WALTER P. RICE and HARVEY RICE, citizens of the United States, residing at Cleveland, in the county of Cuyahoga and State of Ohio, have invented a new and useful Machine for Cleaning and Assorting Fruits, of which the following is a specification.

This invention relates to a machine for cleaning and assorting fruits, such as oranges, lemons, peaches, &c.; and it consists in the new constructions and combinations of mechanisms specially adapted for the purpose, substantially as hereinafter described, and pointed out in the claims.

In the accompanying drawings, Figure 1 is a perspective view of our new machine as seen in working order. Fig. 2 is an end elevation, omitting the hopper, showing the end of the rotary and stationary brushes. Figs. 3 and 4 are an end and side elevation, respectively, of a trapping device designed for sorting the fruit. Fig. 5 is a cross-section through the hopper, showing a device for separating one fruit at a time from the quantity of fruit in the hopper and starting it rolling down over the brush-cleaner and to the trappers. Fig. 6 is a side view, detached, of a separator-wheel and the pulley for turning it.

The following is a description in detail of the construction and operation of the machine.

A, Figs. 1 and 2, represents a round and rotary brush journaled in bearings $b$, supported on suitable posts B B, standing on a table or bench $B^2$.

A' is a permanent brush fixed onto a slanting side board $A^2$ at one side of the rotary brush and supported on one arm of the yokes B' B', also standing on the table or bench $B^2$.

$A^3$ is also a plain slanting side board attached to the opposite arms of the yokes B' B', between which and the brush A' the rotary brush A freely revolves.

C C are legs or trestles fixed on hinges to the under side and at the ends of the table in such a manner that the height and inclination of the table may be adjusted at any given angle to give the required pitch to the brush for the easy rolling of the fruit. Oval-shaped fruits, such as lemons and peaches, require more pitch than round fruit like oranges for traversing the brush and trough.

D is a hopper adjoining the upper end of the brushes for holding the fruit to be delivered to the brushes. It is supported on a stand or trestle D'.

E is a trough connected with the lower end of the brushes, into which the fruit is discharged and leading to the sorting-traps.

In the hopper D and the trough E are provided separating devices for separating and delivering one fruit at a time to the brushes and to the sorting-traps as follows: F is a rotary wheel (or wheels) fixed on a shaft under the hopper and turns in slots in the hopper-bottom. It has four, five, or six inwardly-curved cavities in its periphery, each one of which is adapted for catching and holding one fruit, and as said wheel revolves will deliver the fruit onto the brush and start them rolling one at a time and at equal intervals. G is a rocking separator consisting of one or more curved pieces pivoted at their middle in slots in the bottom of the trough, adapted, like the wheel F, to catch and deliver the fruit one at a time to the sorting-traps. Motion is imparted to these parts by means as follows:

H is a driving-shaft supported in bearings $h\ h$, fixed on table at the upper right-hand corner. I is a driving-pulley or sprocket-wheel fixed on the end of shaft H and is connected by a belt or chain $i$ with a pinion or sprocket-wheel on the upper end of the rotary-brush journal. On the opposite end of shaft H is provided a bevel-gear J. K is a short counter-shaft journaled in a bearing-block $k$ and having a bevel gear-wheel L, meshing with and driven by the gear J. On the opposite end of shaft K are placed a small pulley or sprocket $L^2$ and a larger pulley or sprocket M. The small pulley or sprocket $L^2$ is connected by a belt or chain $l$ with a large pulley or sprocket L' on the shaft of the separator-wheel F. N is a short shaft supported in a bearing-block $f$ at the lower end of the table. O is a pulley or sprocket on said shaft N, connected by a belt or chain P with pulley or sprocket M. Q is a crank-disk on opposite end of shaft N, having a connecting-rod $q$, adjustable as to its length, connecting it with the rocker-separator G at one side of its pivot. The operations of this mechanism will be seen to be that when power is applied to the driving-wheel I (which may be by hand or otherwise) motion is transmitted to the brush and separators alike. The pulleys or wheels are so proportioned that the separator-wheel F makes one revolution to four, five, or six rocking movements of the separator G, in accordance with the number of cavities in the periphery of said wheel F, so that the separators shall work in unison for the equal and uniform delivery of fruit to the brushes and separators.

The assorting device is described as follows:

R, Figs. 1, 3, and 4, represents stands for supporting the working parts.

S is a frame having rods $t\,t$ which are inserted in sleeves $r\,r$ of the stand-legs and are held in place by set-screws $s\,s$, which permit of vertical adjustment. By the vertical adjustment of the traps any required inclination of the troughs leading to and from the traps may be made for the easy rolling of the fruit.

T T are yokes attached to the frame S for supporting the ends of the troughs E E'.

U U are trap-leaves pivoted between said yokes, so that they may swing and open downwardly, as seen at $U^\times$ in Fig. 1.

$v\,v$ are delicate springs, of rubber or other suitable material, attached to the outer sides of the leaves and are connected to adjusting rings or screws $u\,u$, held in brackets $w\,w$ on the sides of the frame S, whereby the tension of the springs may be nicely adjusted.

The fruit is assorted by weight and not by size, the traps being susceptible of such nice adjustment by means of the varying adjustability in tension of the springs that the assortment of fruit can be made with a difference in weight of one ounce or less between the several assortments. Thus the heavier fruits will trip the upper traps, while the lighter will pass over them and on to the next traps, so that by this means several or any desired number of assortments of fruit can be made.

Beneath the traps are provided troughs Y for catching and conveying the assorted fruits into baskets or other suitable receptacles.

Having described our invention, what we claim is—

1. In a machine for cleaning and assorting fruit by a continuous operation, a rotary brush A journaled in posts B B, standing on table $B^2$, an inclined stationary brush A', fixed on an inclined leaf $A^2$ at the side of the brush A, and supported by the yokes B' B', also standing on said table $B^2$, a shaft H supported in bearings $h\,h$, mounted on said table $B^2$, at one side of the brushes, a driving pulley-wheel mounted on said shaft H, a driving-belt $i$ connecting said driving-wheel with a pinion $i'$ on the end of the rotary-brush journal, a bevel-pinion J on said shaft H, a counter-shaft K mounted in a bearing-block $k$, also mounted on the table $B^2$, a bevel-gear L on said counter-shaft meshing with pinion J, a pulley $L^2$ on said shaft K, a hopper D mounted adjacent to the end of said brushes A A', a rotary feed-block F mounted on a cross-shaft under the hopper, a pulley L' on said cross-shaft, a belt $l$ connecting the pulley L' with the driving-pulley $L^2$, a receiving-trough E connected with lower ends of the brushes A A', a fruit-separating rocker G pivoted in slots in the bottom of the said trough, a shaft N mounted in a block $f$ standing on the table $B^2$, a crank-disk Q on said shaft N, connected by a rod $q$ with said rocker-separator, a pulley O on said shaft N connected by belt P with the pulley M on the aforesaid counter-shaft K, the construction and combination being such that the several parts of the machine have simultaneous operation, as and for the purpose set forth.

2. In a machine for cleaning and assorting fruit, the combination with a receiving-trough, of a reciprocating separator consisting of a curved rocker pivoted in slots in the bottom of the trough, a connecting-rod connecting the rocker with a crank-shaft fixed on the table beneath said trough, and means for operating said rocker simultaneously with the feed-separator and the rotary brush, substantially as described.

3. In a machine for cleaning and assorting fruit, the combination with the brushes and separating mechanisms, of assorting-traps, comprising supporting-stands, yokes adjustably mounted on said stands, troughs supported by said yokes, trap-leaves pivoted between said yokes, springs attached to said trap-leaves and connected with adjusting-screws attached to the frames below the leaves, the arrangement of the tension of the springs being such that the assortment is made by the difference in weight of the fruit for tipping the trap-leaves, substantially as described.

WALTER P. RICE.
HARVEY RICE.

Witnesses:
GEO. W. TIBBITTS,
CHARLES ZUCKER.